(12) United States Patent
Shimamura et al.

(10) Patent No.: US 6,560,173 B2
(45) Date of Patent: May 6, 2003

(54) SERVO CONTROL APPARATUS FOR OPTICAL DISC PLAYER

(75) Inventors: Takao Shimamura, Kawagoe (JP); Takashi Sasaki, Kawagoe (JP); Kenichi Takahashi, Kawagoe (JP); Yoshihiro Hashizuka, Kawagoe (JP); Koichi Kikuchi, Kawagoe (JP); Shinya Honjou, Kawagoe (JP); Takashi Suzuki, Kawagoe (JP); Hideaki Yoshimura, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 56 days.

(21) Appl. No.: 09/836,456

(22) Filed: Apr. 18, 2001

(65) Prior Publication Data
US 2002/0009026 A1 Jan. 24, 2002

(30) Foreign Application Priority Data
Apr. 28, 2000 (JP) ........................................ 2000-129633

(51) Int. Cl.$^7$ ................................................ G11B 7/00
(52) U.S. Cl. ................................ 369/44.29; 369/44.35
(58) Field of Search ........................... 369/44.27, 44.29, 369/44.31, 44.35, 44.36, 53.23, 53.28

(56) References Cited

U.S. PATENT DOCUMENTS

| | | | | |
|---|---|---|---|---|
| 5,146,443 A | * | 9/1992 | Iwase et al. | 369/44.29 |
| 5,600,615 A | * | 2/1997 | Kiyoura et al. | 369/44.35 |
| 6,240,055 B1 | * | 5/2001 | Takamine et al. | 369/44.29 |

FOREIGN PATENT DOCUMENTS

JP   7-130087   5/1995

* cited by examiner

Primary Examiner—Paul W. Huber
(74) Attorney, Agent, or Firm—Morgan, Lewis & Bockius LLP (57) ABSTRACT

A servo-control apparatus is provided for use with an optical disc player for reading and/or recording information. The apparatus includes an adjustment section for performing coarse and fine adjustment of a servo loop gain in accordance with a storage medium loaded in the player; a memory for storing a gain adjustment value; a discriminator for determining, upon one of reading and recording information, that the storage medium has already been subjected to the coarse and fine adjustment; and a controller. The controller allows the adjustment section to perform the fine adjustment of the servo loop gain in accordance with the stored adjustment value when it is determined that the storage medium has already been subjected to the coarse and fine adjustment.

8 Claims, 7 Drawing Sheets

FIG. 6A DISTURBANCE AMPLITUDE

FIG. 6B RF SIGNAL

FIG. 6C LEVEL SIGNAL

SERVO CONTROL APPARATUS FOR OPTICAL DISC PLAYER

BACKGROUND OF THE INVENTION

1. Field of the Invention

The present invention relates to an optical pickup servo-control apparatus for use with an optical disc recording and/or reproducing apparatus.

2. Description of the Related Art

It is required for a recording and/or reproducing apparatus (hereinafter, referred to as a recording/reproducing apparatus) to attain a precise recording/reproduction of the information stored on an optical disc such as a CD (Compact Disc) or a DVD (Digital Versatile Disc). Accordingly, such a recording/reproducing apparatus generally employs a servo-control apparatus such as a tracking or focusing servo system to provide a controlled reading position for the optical pickup for reading recorded information.

A servo-control technique employed in such an apparatus makes use of a read RF signal from the optical pickup to generate an error signal. It is necessary to provide an appropriately gain-controlled voltage for the signal to be supplied to an error signal generator section for generating the error signal. Thus, the apparatus is generally provided with an automatic gain control (AGC) circuit for providing a controlled gain in accordance with an input signal. In particular, the technique for performing the automatic gain control using a disturbance source is useful since it provides a precise measurement of gain control for the apparatus. In addition, the technique can perform the automatic gain control before a recording and/or reproducing operation to provide a gain set point for the servo system, thereby making it possible to continue stabilized servo-control thereafter.

A disc recording/reproducing apparatus including such an automatic gain control circuit as described above can best provide a controlled gain by performing automatic control each time information is read and/or recorded on the disc. However, this requires a certain amount of time for the apparatus to complete the automatic gain control and then read or record information on the disc. In this regard, there is a method available for shortening the length of set-up time required to complete the automatic gain control. According to the method, the automatically controlled gain provided upon reading or recording information on the disc is stored to be used again in the following reading or recording. Such a method for controlling a disc recording/reproducing apparatus is disclosed, for example, in Japanese Patent Laid-Open Publication Kokai No. H7-130087.

However, in many cases, characteristics of discs and service conditions of recording/reproducing apparatuses are different each time they are used as well as service environments such as ambient temperature and humidity. Thus, the stored control gain is not always most suitable. For example, when a disc is once removed from a recording/reproducing apparatus and then re-loaded to the apparatus, a slight variation in a loading condition would require a different optimum control gain. Thus, in some cases, this would result in a decrease in servo-control performance or deterioration in quality of reading or recording.

OBJECT AND SUMMARY OF THE INVENTION

The present invention has been made in view of the aforementioned problems. It is an object of the present invention to provide a servo control apparatus which can shorten the set-up time and perform stabilized servo control with high accuracy.

To achieve the object, according to the present invention, there is provided a servo control apparatus for use with an optical disc player for reading and/or recording information on a storage medium, which comprises an adjustment section for performing coarse and fine adjustment of a servo loop gain in accordance with the storage medium loaded in the player; a memory for storing a gain adjustment value in the adjustment section; a discriminator for determining, upon one of reading and recording information on the storage medium, that the storage medium has already been subjected to the coarse and fine adjustment of the servo loop gain by the adjustment section; and a controller for allowing the adjustment section to perform the fine adjustment of the servo loop gain in accordance with the gain adjustment value stored in the memory when the discriminator has determined that the storage medium has already been subjected to the coarse and fine adjustment of the servo loop gain.

DETAILED DESCRIPTION OF THE PREFERRED EMBODIMENTS

The present invention will be described below in more detail in accordance with the embodiments with reference to the accompanying drawings wherein like reference numerals designate like reference elements.

Figure 1:
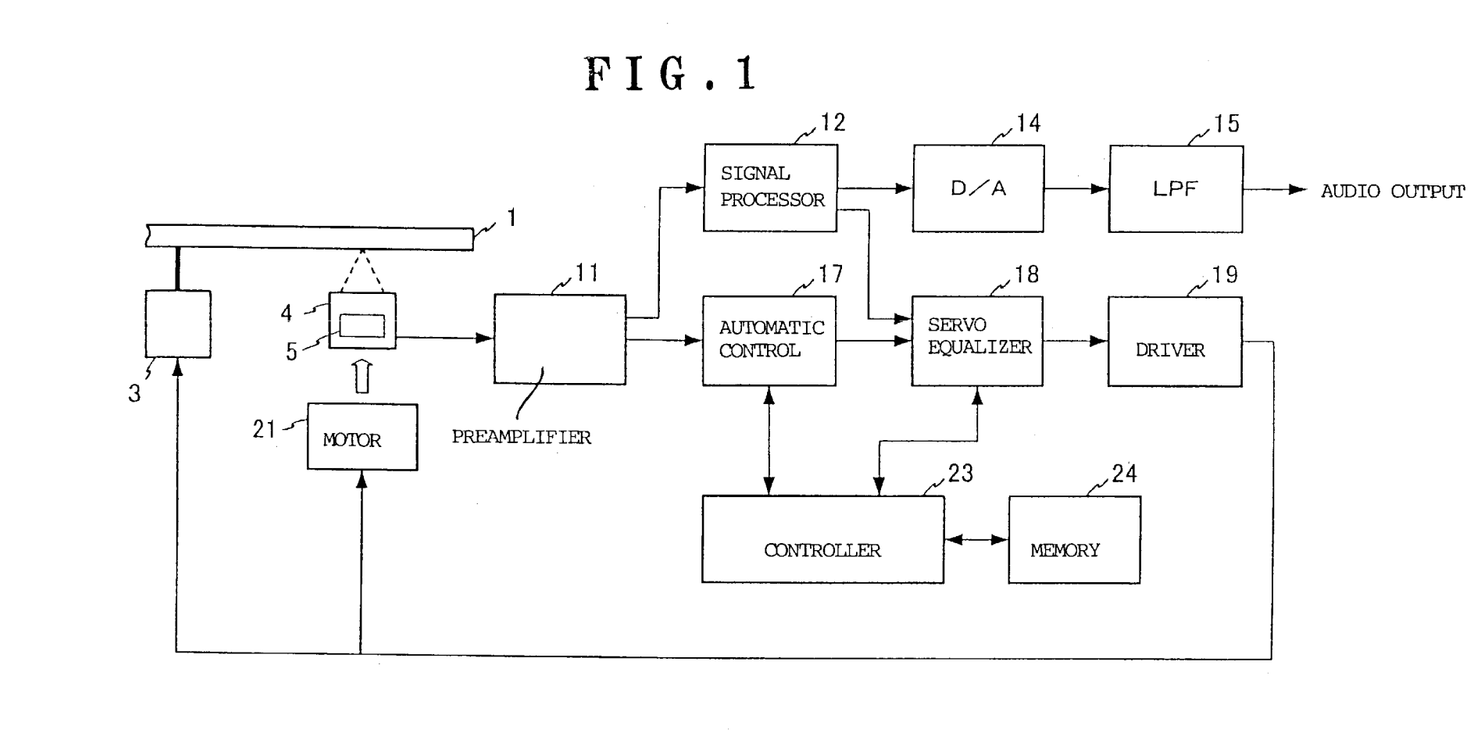
FIG. 1 is a block diagram showing the configuration of a servo control apparatus for use with an optical disc player according to the present invention.

FIG. 1 is a block diagram illustrating the configuration of a servo control apparatus for use with an optical disc player according to an embodiment of the present invention.

Referring to FIG. 1, an optical disc 1 is rotationally driven by a spindle motor 3. An optical pickup 4 radiates the optical disc 1 with laser light and then receives light reflected on the optical disc 1 to generate a signal according to the intensity of the received light.

An optical detector 5 disposed within the optical pickup is, for example, a four-part split optical detector comprising our light-receiving elements. Each of the four light-receiving elements receives a beam of light reflected on the optical disc 1 and then converts the light into electrical signals, which are in turn outputted as read signals $RB_1$–$RB_4$. The optical pickup 4 is also provided with a tracking actuator (not shown) and a focusing actuator (not shown). The tracking actuator changes the direction of an objective lens (not shown) to displace a read point or beam spot in the radial direction of the disc. On the other hand, the focusing actuator controls the focus position of the aforementioned beam spot.

With the aforementioned configuration, the optical pickup 4 reads information recorded on the optical disc 1 to supply the resulting read signal to a preamplifier 11. The preamplifier 11 amplifies the read signal and then extracts a tracking error signal TE and a focusing error signal FE from the read signal. A signal processing circuit 12 demodulates the read signal from the preamplifier 11 and corrects for the errors to supply the resulting signal to a digital-to-analog (D/A) converter 14. The D/A converter 14 converts a digital signal from the signal processing circuit 12 into an analog signal. A low-pass filter (LPF) 15 allows an audible frequency band of an analog signal supplied from the D/A converter 14 to pass therethrough, thereby eliminating noise components to output an audio signal.

On the other hand, the error signals outputted from the preamplifier 11 such as the tracking error signal TE and the focusing error signal FE are gain controlled to a predetermined signal level in an automatic gain control section 17. Then, the resulting signals are supplied to a servo equalizer 18. The servo equalizer 18 performs phase control of the gain controlled signals to supply the resulting signals to a driver 19 as drive signals. The driver 19 amplifies the drive signals to generate signals for driving the tracking actuator, the focusing actuator, a slide motor 21, and the spindle motor 3. Each of the sections mentioned in the foregoing is connected to a controller (microcomputer) 23 and controlled thereby. In addition, the controller 23 is connected with a memory 24 for storing various data such as control gains provided in the past. It should be noted that the controller 23 is not limited to a microcomputer and may be made up of a plurality of individual circuit blocks.

Figure 2:
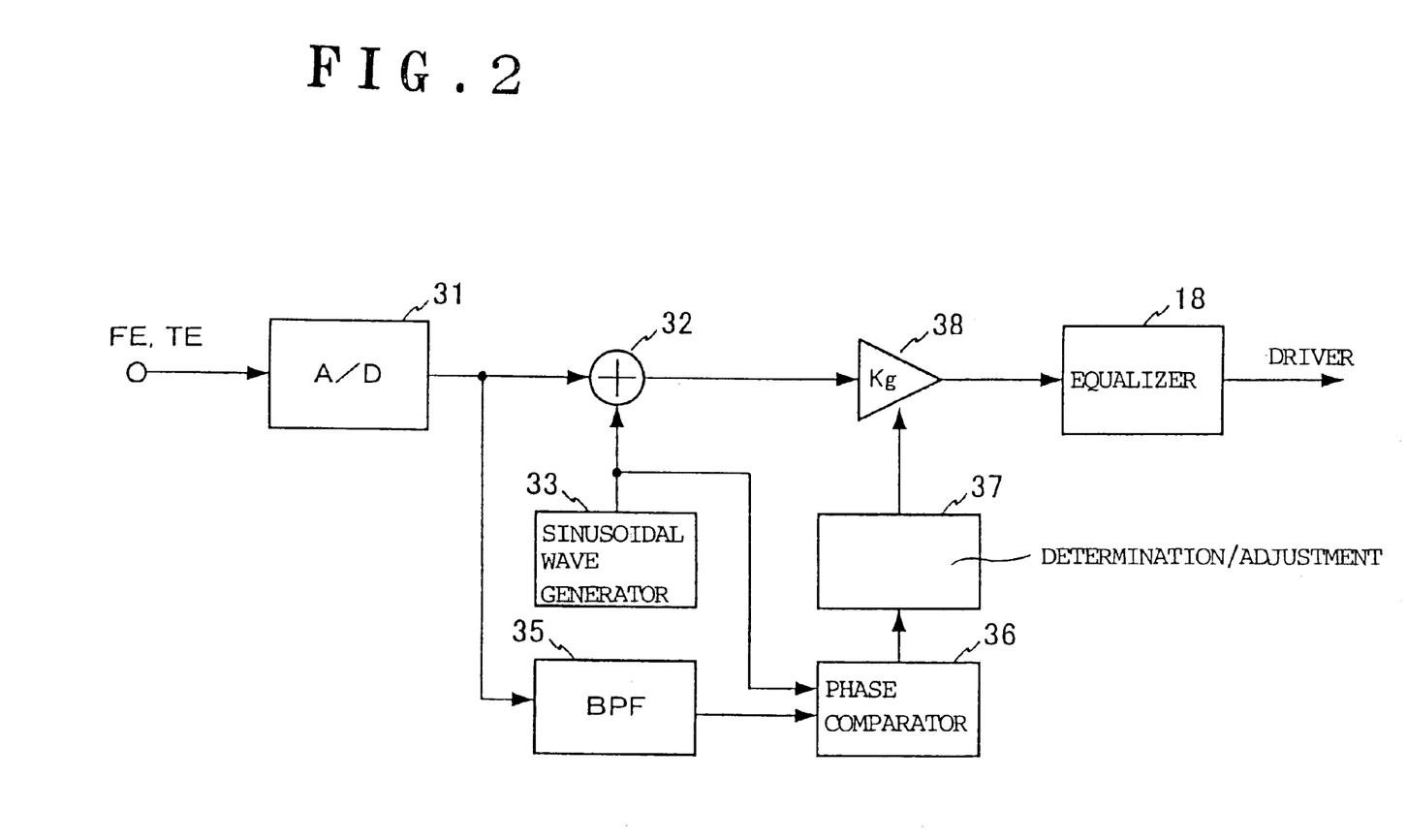
FIG. 2 is a block diagram showing in detail the configuration of an automatic gain control section.

FIG. 2 is a block diagram showing in detail the configuration of the automatic gain control section 17. The error signals such as the tracking error signal TE and the focusing error signal FE are converted into digital error signals in an analog-to-digital (A/D) converter 31 and then supplied to a summation circuit 32. A sinusoidal wave generator 33 generates a sinusoidal wave (e.g., 1.38 kHz) of a gain control frequency as a disturbance signal, which is in turn added to the aforementioned error signals in the summation circuit 32. The disturbance signal circulates the servo loop and the resulting signal is supplied to a band-pass filter (BPF) 35, the component of a predetermined band being supplied to a phase comparator 36. The phase comparator 36 compares phases between a signal from the BPF 35 and the disturbance signal from the sinusoidal wave generator 33 to obtain a phase difference. The resulting phase difference is supplied to a determination/adjustment section 37. In this section, the gain (Kg) of an amplifier 38 is adjusted to fall within a predetermined range (a determination window, e.g., a range of ±5.6°) with respect to the phase designated by the controller 23. For example, the gain (Kg) of the aforementioned amplifier 38 is adjusted with a change of 64 steps (i.e., about ±12 dB) with one step being set to 0.2 dB.

Now, the set-up procedure and the servo control operation of the optical disc player according to the present invention will be described below. Incidentally, the servo control operation to be described below is carried out as part of the set-up procedure.

Figure 3:
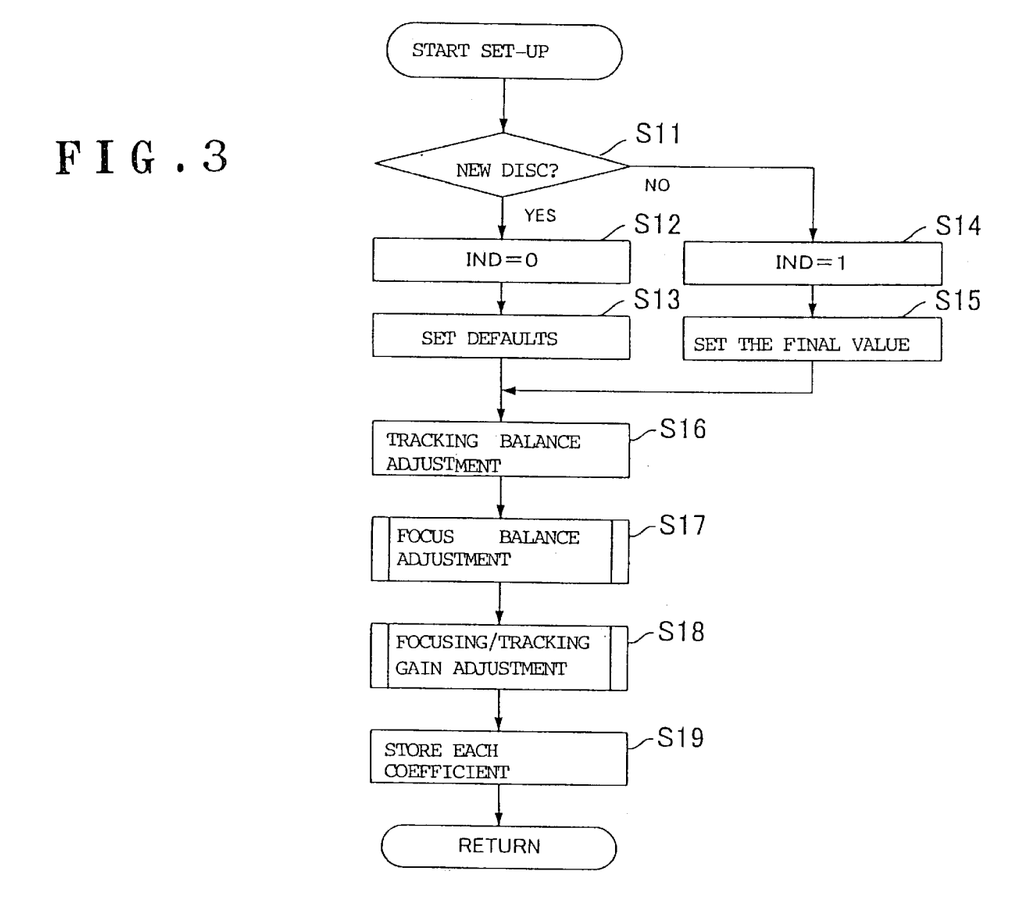
FIG. 3 is a flowchart showing the set-up procedure of an optical disc player according to the present invention.

FIG. 3 is a flowchart showing the set-up procedure of the optical disc player. It is determined whether the disc on which reading and/or recording are initiated is a newly loaded disc (step S11). In more detail, in the case where the set-up has been completed for reading and/or recording information on the disc and adjustment values have been stored in the optical disc player with the disc having not been removed from the player thereafter, it is determined that the disc is not a newly loaded one (NO). Otherwise, it is determined that the disc is a newly loaded one (YES).

Methods for carrying out this determination include, for example, a method in which a signal indicating an operation required for removing (unloading) the disc such as withdrawing the loading tray is detected and stored, based on which the determination is carried out.

When it is determined in step S11 that the disc is a newly loaded one ("YES"), an indicator (or, a flag or the like) for indicating the resulting determination or IND is set to "0" (i.e., IND=0) (step S12). Then, various set points such as each of the adjustment values an equalizer coefficient, a gain, and commands are set to their defaults (step S13). On the other hand, if it has been determined that the disc is not a newly loaded one ("NO"), the indicator IND is set to "1" (i.e., IND=1) (step S14). Then, the aforementioned various set points are set to the stored values or final values (last values), which have been stored in the memory 24 (step S15).

Subsequently, a tracking balance adjustment is carried out (step S16). Then, a focus balance adjustment routine is called to carry out a focus balance adjustment (step S17). After the focus balance adjustment has been performed, a focusing/tracking gain adjustment routine is called (step S18) to carry out the focusing and tracking gain adjustment. The procedure of the aforementioned focus balance adjustment routine and the focusing/tracking gain adjustment routine are to be described in detail later. After the aforementioned adjustments have been completed, each of the adjustment values, the coefficients and the like are stored (step S19) and then control exits the set-up procedure.

Figure 4:
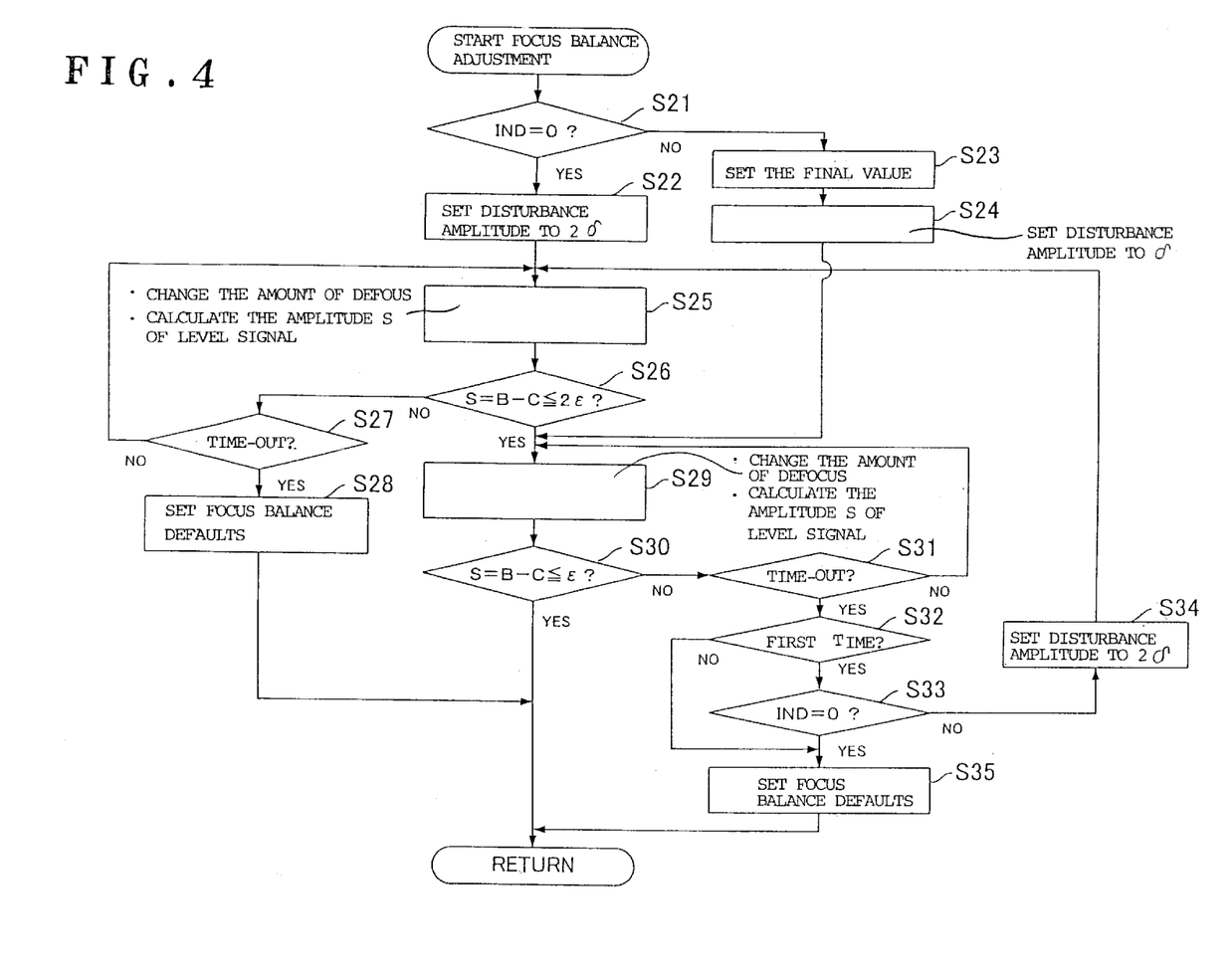
FIG. 4 is a flowchart showing the procedure for controlling focus balance according to the present invention.
Figure 5:
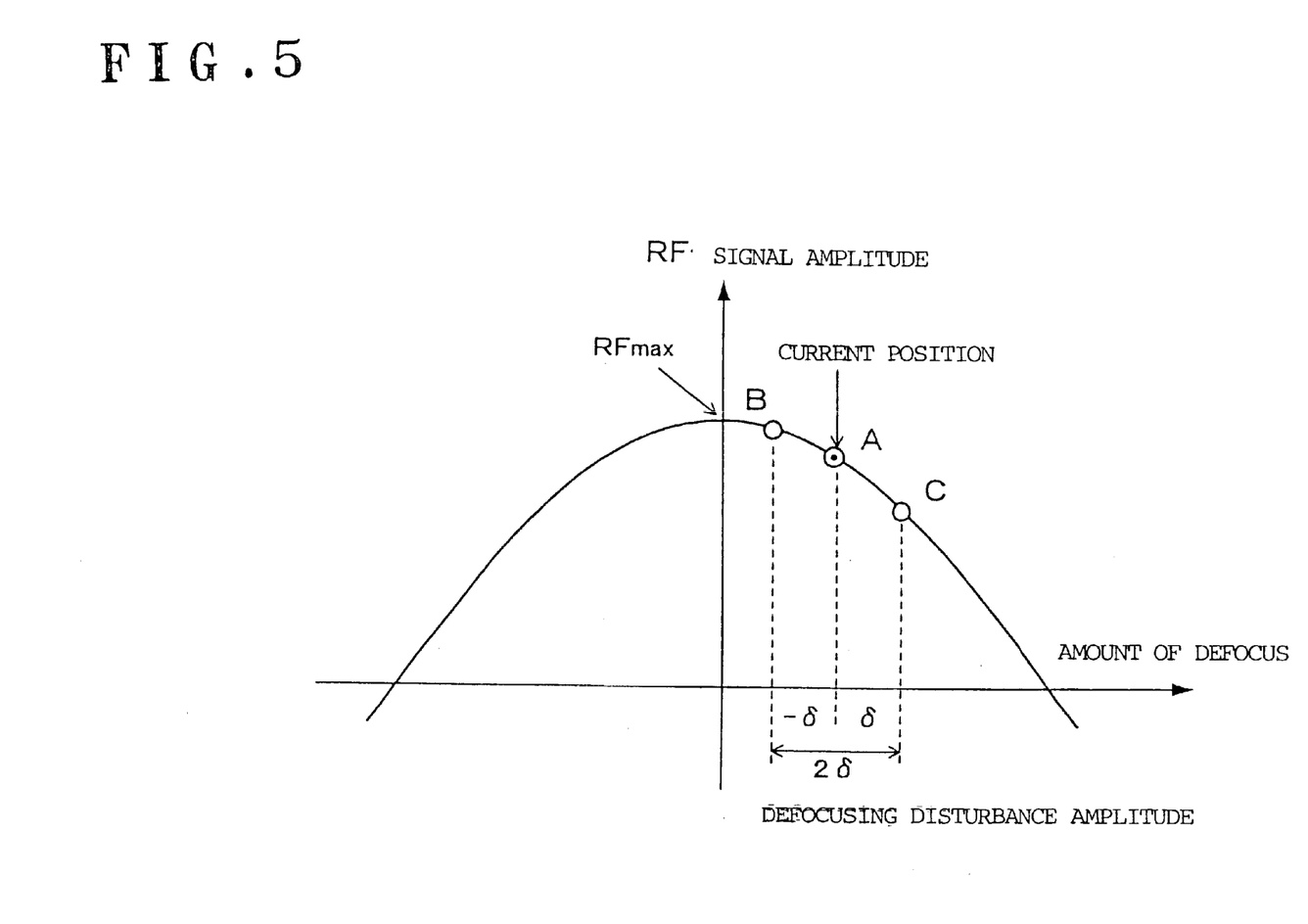
FIG. 5 is a graph showing a change in amplitude of a read RF signal when a defocusing signal is given to a pickup in a stepwise manner.
Figure 6A:
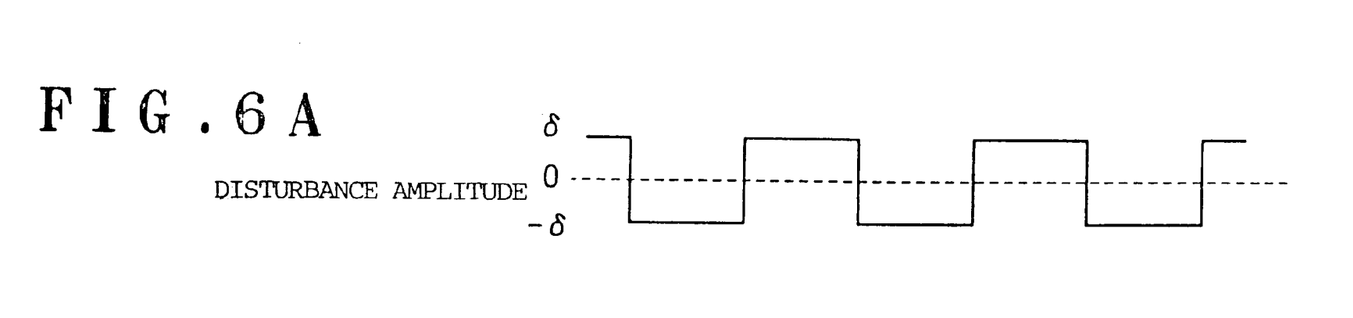
FIGS. 6A–6C show graphs showing a variation in amplitude of a defocusing disturbance signal given to an optical pickup in a stepwise manner, a read RF signal, and a level signal, respectively.
Figure 6B:
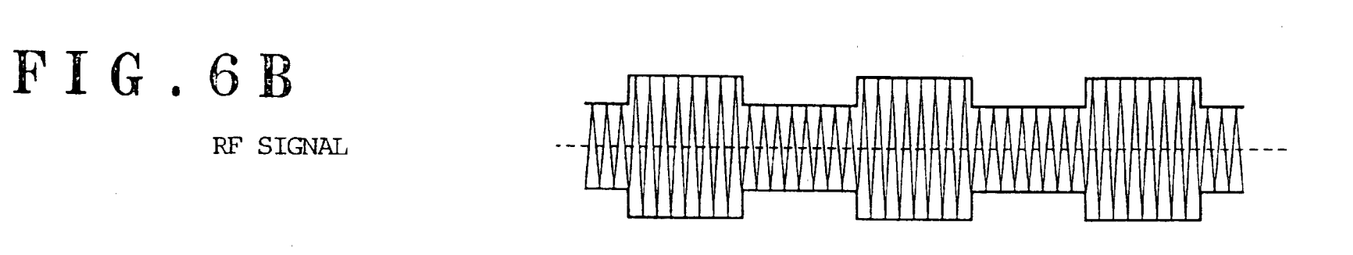
Figure 6C:
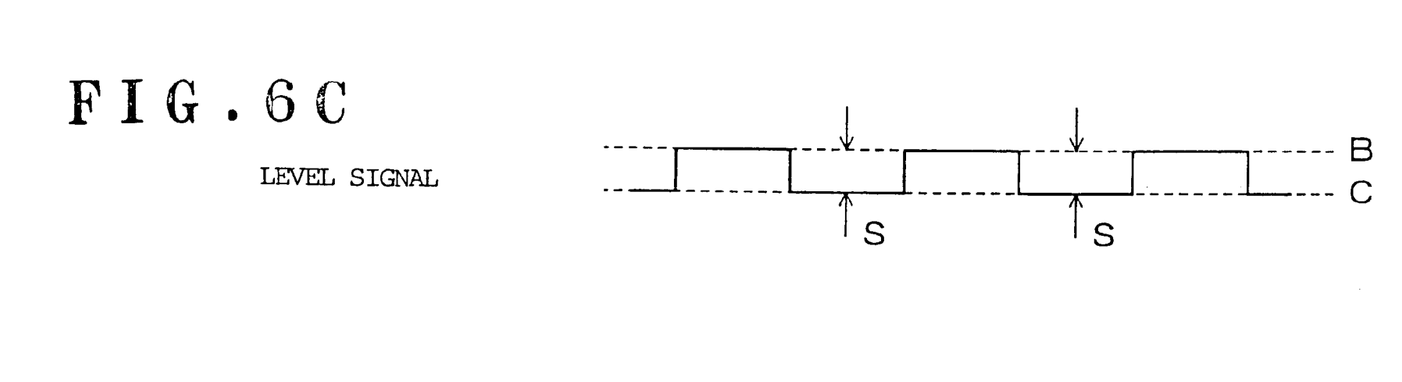

The procedure for adjusting the focus balance will be described with reference to the flowchart of FIG. 4, and FIGS. 5 and 6. It is determined, referring to the aforementioned indicator IND, whether the disc is a newly loaded one (step S21). When it is determined that the disc is not a newly loaded one (NO) (IND≠0), each of the adjustment values, the coefficients and the like are set to the final values provided through the previous automatic control (step S23). Then, the amplitude of the disturbance is set to half the aforementioned predetermined value δ (i.e., ±δ/2) (step S24). Thus, the disturbance amplitude is set to a magnitude of amplitude representative of a fine adjustment of the focus balance adjustment, and then control proceeds to step S29.

This is done as such because, for example, with a disc such as a CD-RW, using the final values would provide the same condition as that in which a coarse adjustment has been completed. Therefore, once adjusted, the disc needs only a fine adjustment. When a servo level such as a gain is significantly deviated from an optimum value for a CD-RW, CD-R or the like, to carry out an optimum automatic control, a coarse adjustment is carried out first and then followed by a fine adjustment, thereby providing improved adjustment accuracy, as will be described below.

When it is determined in step S21 that the disc is a newly loaded one (IND=0), the disturbance amplitude is set to the predetermined value (2δ) (step S22). In other words, the disturbance amplitude is set to a magnitude of amplitude representative of a coarse adjustment of the focus balance adjustment.

The disturbance amplitude has a step-shaped magnitude for varying the amount of defocus of the optical pickup. As shown in FIG. 5, when a disturbance amplitude of 2δ (i.e., ±δ) is given to the current position (A), the amplitude of the read RF signal of the optical pickup (i.e., the envelope intensity of the RF signal) varies between positions B and C, and the RF signal is modulated as shown in FIG. 6B. Then, as shown in FIG. 6C, a circuit such as an envelope detector circuit (not shown) is used to convert the modulated RF signal into a signal (hereinafter referred to as a level signal) corresponding to a change in the aforementioned RF signal amplitude.

Then, the focus balance adjustment is carried out through the control of the controller 23. The amount of defocus shown in FIG. 5 (i.e., the current value) is changed and the amplitude S (=B−C) of the level signal at that time is calculated (step S25). It is then determined whether the amplitude S of the calculated level signal is equal to or less than a predetermined threshold (2ε) (step S26). When it is determined that the amplitude S exceeds the predetermined threshold (2ε), it is then determined whether the predetermined period of time-out has elapsed (step S27). If the predetermined period of time-out has elapsed, focus balance defaults are set (step S28) and then control exits the current routine. If the period of time-out has not yet elapsed, control returns to step S25 to repeat the aforementioned steps.

If it is determined in step S26 that the amplitude S is equal to or less than the predetermined threshold (2ε), control proceeds to the procedure for carrying out the fine adjustment operation subsequent to step S29. The amount of defocus (i.e., the current value) is changed and the amplitude S (=B−C) of the level signal at that time is calculated (step S29). It is then determined whether the amplitude S of the calculated level signal is equal to or less than a predetermined threshold (ε) (step S30). If it is determined that the amplitude S exceeds the predetermined threshold (ε), it is then determined whether the predetermined period of time-out has elapsed (step S31). If the period of time-out has not yet elapsed, control repeats the steps from step S29.

When the predetermined period of time-out has elapsed in step S31, it is then determined whether the adjustment has been carried out for the first time (step S32). If the adjustment has been performed for the second time, control proceeds to step S35 to set focus balance defaults and then exits the current routine. If the adjustment is carried out for the first time, it is then determined whether the disc is a newly loaded one, that is, the indicator IND is "0" (step S33). If the disc is not a newly loaded one (IND≠0), it is regarded that the aforementioned focusing actuator operation has not provided an optimum focus balance adjustment value. Thus, the disturbance amplitude is changed to the value of the coarse adjustment of 2δ (step S34) and then control repeats the steps of the focus balance adjustment from step S25. On the other hand, when it is determined in step S33 that IND=0, the predetermined defaults are set (step S35) and then control exits the current routine. The focus balance adjustment is carried out with the steps described above.

Figure 7:
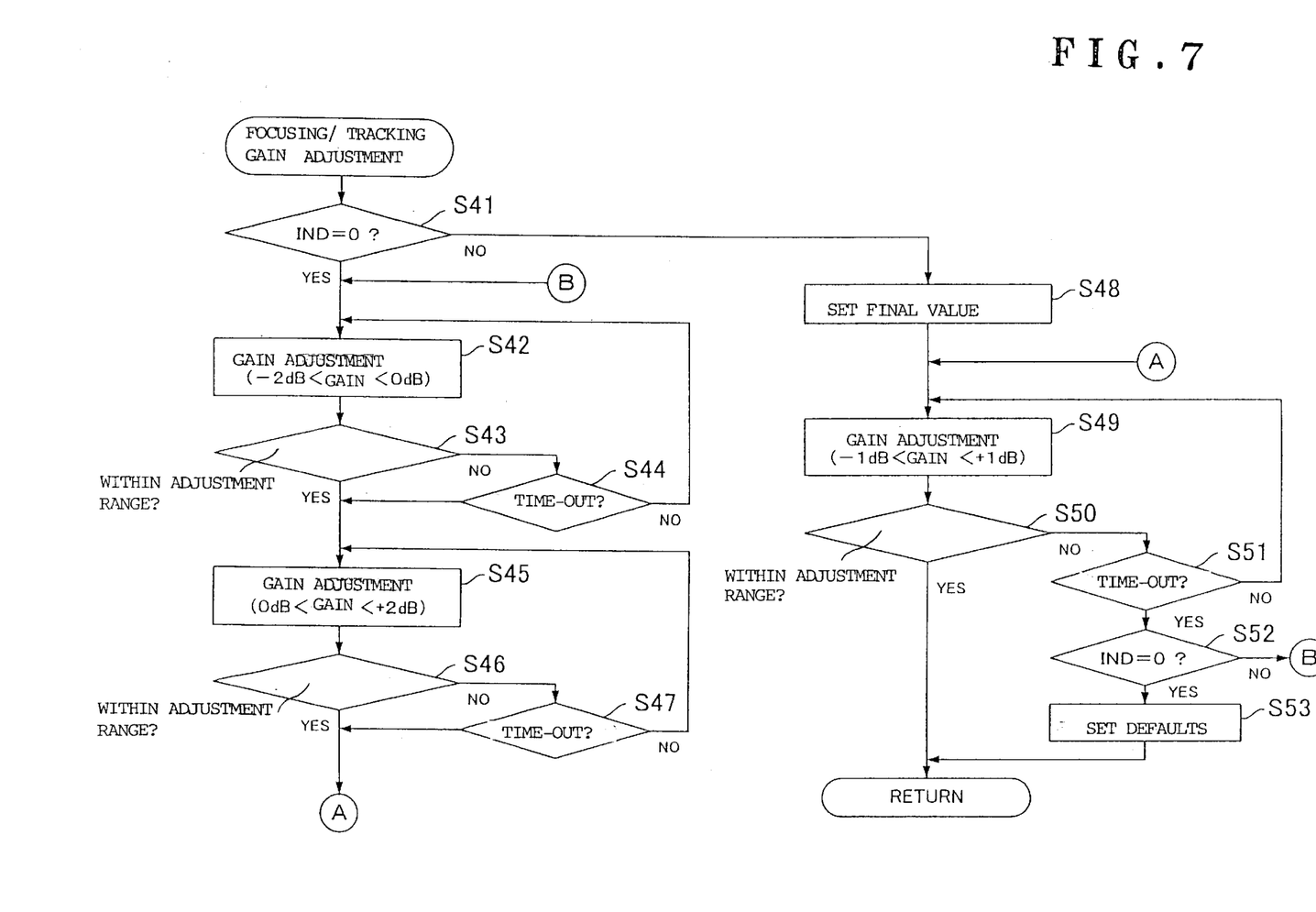
FIG. 7 is a flowchart showing the procedure for controlling focusing and tracking gains according to the present invention.

The procedure for adjusting the focusing/tracking gain is described below with reference to the flowchart of FIG. 7. It is determined in accordance with the aforementioned indicator IND whether the disc is a newly loaded one (step S41). If the disc is a newly loaded one or IND=0, then control proceeds to the steps of the coarse gain adjustment, which follow step S42. On the other hand, if the disc is not a newly loaded one or IND≠0, then control proceeds to the steps of the fine gain adjustment, which follow step S48.

If IND=0 in step S41, a gain adjustment is carried out with the gain ranging from −2 dB to 0 dB (step S42). This gain adjustment is performed in the gain adjustment section which is described with reference to FIG. 2. Then, it is determined whether an adjustment value has fallen within the adjustment range (step S43). If the adjustment value is not within the adjustment range, control initiates the gain adjustment after step S42 and then it is determined whether the predetermined period of time-out has elapsed (step S44). If the predetermined period of time-out has not elapsed, control returns to step S42 to repeat the step of gain adjustment. On the other hand, if the period of time-out has elapsed, control proceeds to step S45.

If the adjustment value is within the range of adjustment in step S43, control proceeds to step S45. In steps S45 to S47, the same gain adjustment as in steps S42 to S44 is carried out with the gain falling within the range from 0 dB to +2 dB. Thus, control allows the procedure of steps S42 to S47 to perform the coarse gain adjustment. After the coarse gain adjustment has been completed, control proceeds to step S49 to perform the fine gain adjustment, which will be described later.

If IND≠0 in step S41, the gain is set to the final value provided through the previous automatic control (step S48), and gain adjustment is then carried out with the gain ranging from −1 dB to 0 dB (step S49). Then, it is determined whether the adjustment value has fallen within the adjustment range (step S50). If the adjustment value is not within the adjustment range, control initiates the gain adjustment after step S49 and it is then determined whether the predetermined period of time-out has elapsed (step S51). If the predetermined period of time-out has not elapsed, control returns to step S49 to repeat the step of gain adjustment. On the other hand, if the period of time-out has elapsed, control proceeds to step S52, where it is determined whether IND=0 (step S52). If the disc is not a newly loaded one (IND≠0), it is regarded that the aforementioned fine adjustment operation has not provided an optimum adjustment value. Thus, control proceeds to step S42 to carry out the coarse gain adjustment (steps S42 to S47). If IND=0, the predetermined defaults are set (step S53) and then control exits the current routine. The gain adjustment is thus carried out in the steps described above.

Accordingly, in the case where the disc has not been removed from the apparatus upon carrying out reading and/or recording information thereon, as described above, using stored adjustment values makes it possible to provide a shortened period of set-up time and highly accurate stabilized servo control.

Incidentally, the aforementioned numerical values employed in the explanations such as the width of the fine and coarse adjustment values, frequencies, and gains have been shown only as an example. Thus, the numerical values may be employed as appropriate in accordance with the servo control apparatus or the like to be used.

As described above in detail, according to the present invention, a high-performance servo control apparatus can be realized which has a shortened set-up time and a stabilized and highly-accurate servo-control capability.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on a Japanese Patent Application No. 2000-129633 which is hereby incorporated by reference.

What is claimed is:

1. A servo control apparatus for use with an optical disc player for reading and/or recording information on a storage medium, comprising:

an adjustment section for performing coarse and fine adjustment of a servo loop gain in accordance with the storage medium loaded in the player;

a memory for storing a gain adjustment value in said adjustment section;

a discriminator for determining, upon one of reading and recording information on the storage medium, that the storage medium has already been subjected to the coarse and fine adjustment of said servo loop gain by said adjustment section; and a controller for allowing said adjustment section to perform the fine adjustment of said servo loop gain in accordance with the gain adjustment value stored in said memory when said discriminator has determined that the storage medium has already been subjected to the coarse and fine adjustment of said servo loop gain.

2. A servo control apparatus according to claim 1, wherein said adjustment section changes said gain adjustment value in a stepwise manner to perform the coarse and fine adjustment of said servo loop gain.

3. A servo control apparatus for use with an optical disc player for reading and/or recording information on a storage medium, comprising:

an adjustment section for performing coarse and fine adjustment of a focus balance and a servo loop gain in accordance with the storage medium loaded in the player;

a memory for storing a focus balance adjustment value and a gain adjustment value in said adjustment section;

a discriminator for determining, upon one of reading and recording information on the storage medium, that the storage medium has already been subjected to the coarse and fine adjustment of said focus balance and said servo loop gain by said adjustment section; and a controller for allowing said adjustment section to perform the fine adjustment of said focus balance and said servo loop gain in accordance with the focus balance adjustment value and the gain adjustment value stored in said memory when said discriminator has determined that the storage medium has already been subjected to the coarse and fine adjustment of said focus balance and said servo loop gain.

4. A servo control apparatus according to claim 3, wherein said controller performs the fine adjustment by decreasing an offset amount in the focus balance adjustment.

5. A servo control method of an optical disc player for reading and/or recording information on a storage medium, comprising:

performing coarse and fine adjustment of a servo loop gain in response to loading of the storage medium in the player;

storing a gain adjustment value obtained in the step of performing coarse and fine adjustment of a servo loop gain;

determining, upon one of reading and recording information on the storage medium, that the storage medium has already been subjected to the coarse and fine adjustment of said servo loop gain in the step of performing coarse and fine adjustment; and performing the fine adjustment of said servo loop gain in accordance with the gain adjustment value stored in the step of storing when it is determined in the step of determining that the storage medium has already been subjected to the coarse and fine adjustment of said servo loop gain.

6. A method according to claim 5, wherein the step of performing coarse and fine adjustment changes the gain adjustment value in a stepwise manner to perform the coarse and fine adjustment of said servo loop gain.

7. A servo control apparatus for use with an optical disc player for reading and/or recording information on a storage medium, comprising:

performing coarse and fine adjustment of a focus balance and a servo loop gain in response to loading of the storage medium in the player;

storing a focus balance adjustment value and a gain adjustment value obtained in the step of performing a coarse and fine adjustment of a servo loop gain;

determining, upon one of reading and recording information on the storage medium, that the storage medium has already been subjected to the coarse and fine adjustment of said focus balance and said servo loop gain in the step of performing coarse and fine adjustment; and performing the fine adjustment of said focus balance and said servo loop gain in accordance with the focus balance adjustment value and the gain adjustment value stored in the step of storing when it is determined in the step of determining that the storage medium has already been subjected to the coarse and fine adjustment of said focus balance and said servo loop gain.

8. A method according to claim 7, wherein the step of performing the fine adjustment performs the fine adjustment by decreasing an offset amount in the focus balance adjustment.

* * * * *